(12) United States Patent
Wendt

(10) Patent No.: US 8,055,481 B2
(45) Date of Patent: Nov. 8, 2011

(54) METHOD FOR PLANNING SHEET PILE WALL SECTIONS

(75) Inventor: Roberto Wendt, Rapid City, SD (US)

(73) Assignee: Pilepro, LLC, Austin, TX (US)

( * ) Notice: Subject to any disclaimer, the term of this patent is extended or adjusted under 35 U.S.C. 154(b) by 565 days.

(21) Appl. No.: 12/224,580

(22) PCT Filed: Feb. 18, 2007

(86) PCT No.: PCT/EP2007/001389
§ 371 (c)(1),
(2), (4) Date: Oct. 30, 2008

(87) PCT Pub. No.: WO2007/098866
PCT Pub. Date: Sep. 7, 2007

(65) Prior Publication Data
US 2009/0306940 A1 Dec. 10, 2009

(30) Foreign Application Priority Data

Mar. 1, 2006 (EP) .................................. 06004147
Jun. 26, 2006 (EP) .................................. 06013136

(51) Int. Cl.
*G06F 17/50* (2006.01)
(52) U.S. Cl. ............................ 703/1; 405/274; 405/278
(58) Field of Classification Search ............... 703/1, 16, 703/5; 405/229, 262, 233, 267, 277, 279, 405/274, 278
See application file for complete search history.

(56) References Cited

U.S. PATENT DOCUMENTS 5,119,307 A 6/1992 Blaha et al.
(Continued)

FOREIGN PATENT DOCUMENTS
WO WO 03/079185 A2 9/2003

OTHER PUBLICATIONS

"QWALLS Bemessung von Traegerbohl", Handbush Des Rtwalls-Prorammteils WWDIM Zur Bemessung XP-007902402, Nov. 2003, pp. 1-44.

(Continued)

*Primary Examiner* — Thai Phan
(74) *Attorney, Agent, or Firm* — Karl F. Milde, Jr.; Eckert Seamans Cherin & Mellott, LLC

(57) ABSTRACT

A method is provided for planning sheet pile wall sections via a user-oriented network—in particular, the Internet—in which at least technical characteristics of a suitable component for the layout of a sheet pile wall section and/or the layout of a sheet pile wall section itself are determined for the user by a computer system. The method comprises the steps of: (a) entering at least two constructional parameters of the sheet pile wall section, via the user-oriented network, into the computer system, within which various data of components for the layout of a sheet pile wall section, data of layouts for sheet pile wall sections, and technical characteristics of the components and the layouts are stored in a database of the computer system; (b) determining at least one suitable component and/or at least one suitable layout, via the computer system, on the basis of the entered construction parameters and the technical characteristics stored in the database; and (c) providing the user with the data of the component and/or layout determined in step (b) and the technical characteristics of the determined component and/or the layout, via the user-oriented network.

19 Claims, 18 Drawing Sheets

U.S. PATENT DOCUMENTS

| | | | |
|---|---|---|---|
| 5,259,705 A * | 11/1993 | Breaux et al. | 405/267 |
| 5,468,098 A * | 11/1995 | Babcock | 405/262 |
| 5,708,798 A | 1/1998 | Lynch et al. | |
| 7,025,537 B2 * | 4/2006 | Russell et al. | 405/229 |
| 7,500,807 B2 * | 3/2009 | Schmitt | 405/229 |
| 2004/0120775 A1 * | 6/2004 | Fomenkov et al. | 405/277 |
| 2006/0193701 A1 * | 8/2006 | Nottingham | 405/278 |
| 2007/0243027 A1 * | 10/2007 | Heindl et al. | 405/274 |
| 2007/0264087 A1 * | 11/2007 | Schmitt | 405/233 |
| 2008/0170913 A1 * | 7/2008 | Moreau | 405/279 |

OTHER PUBLICATIONS

Analysis and Design of Sheet Pile Walls, Soldier Pile Walls and in-situ Concrete Walls, Version 4, Internet Citation, XP007902393, Feb. 2005.

Yau N-J et al., "Applying Case-Based Reasoning Technique to Retaining Wall Selection", Automation in Construction, Elsevier Science Publishers, vol. 7 No. 4, May 1998, pp. 271-283.

Kuehn Guenter, "Der Maschinelle Tiefbau-Chapter 12.2 Vibrationsrammung", 1992, Teuber,XP002448512 pp. 748-749.

Bachman Gregor, "Entwicklung von Geotechnischen Komponenten Fuer Vernetzt-kooperative Planungsprozesse-Verbauwandstatik", 2001, Technische Universitat Darmstadt, XP007902836.

Zen et al., "Corrosion and Life Cycle Management of Port Structures", Corrosion Science, vol. 47, No. 10, Oct. 2005, XP005088792 pp. 2354-2360.

* cited by examiner

Wall Tool Solution (1)

computed solutions

Most efficient solution by weight is the PZC 13 with lb/ft² of 24.2.

Section modulus ≥ 33.0 in³/ft,

Wall length of 50.00 ft,

Sheet-piling length of 18.00 ft,

Additional alternatives:

| Piling designation | section Modulus ? | weight ? | wall length* ? | sections to drive ? | sections to set ? | Total Tons |
|---|---|---|---|---|---|---|
| PZC 18 | 33.5 in³/ft | 24.2 lb/ft² | 50.00 ft | n/a | 24 | 10.9 |
| PZC 19 | 36.1 in³/ft | 26.4 lb/ft² | 50.00 ft | n/a | 24 | 11.9 |
| PZC-B 34 | 63.4 in³/ft | 31.5 lb/ft² (@60% sheet length) | 45.55 ft | 8 | 8 | 12.9 (@60% sheet length) |
| PZC 25 | 45.7 in³/ft | 29.9 lb/ft² | 48.78 ft | n/a | 21 | 13.1 |
| PZC-B 39 | 72.6 in³/ft | 37.7 lb/ft² (@60% sheet length) | 46.21 ft | 8 | 8 | 13.6 (@60% sheet length) |

* calculations will reflect the closest number of piling designations needed

FIG. 3

Wall Tool Solution (2)

PZC-B 34
View specification

📄 Download DWG File
🖨 Print solution
✉ Email data-sheet

Cornering information
Request a Quote
Engineering Help

W30X108  
BBS-M    PZC 13    PZC 13    BBS-F    W30X108

57.8"
68.3"

Solution Components

King Pile: W30x108
Units: 79
Length: 30.00 feet
Tons: 128.0

Sheet length to beam length: 100%  80%  60%

Sheet-piling: PZC 13 (pair)
Units: 79
Length: 18.00 feet
Tons: 71.7

Connector #1: BBS-M
Length: 18.00 feet
Number of feet: 1422.00 feet
Tons: 6.1

Connector #2: BBS-F
Length: 18.00 feet
Number of feet: 1422.00 feet
Tons: 6.5

Solution Summary

| | |
|---|---|
| Piling designation | PZC-B 34 |
| Wall length* | 449.79 ft |
| Sheet-Piling length | 18.00 ft |
| King Pile length | 30.00 ft |
| Section modulus | 63.4 in³/ft |
| lb/ft² | 31.5 |
| Total tons | 212.2 |
| Sections to drive | 79 |
| Setting ratio | 84.6 |
| Driving ratio | 15.4 |

* calculations will reflect the closest even number of wall sections

To recalculate based on a specific, custom sheet length (independent of beam length), click here.

Layout Tool

The layout tool automatically chooses the most efficient layout configuration and piece count, based on your inputs:

A) inside clear dimensions
B) piling designations

Should you wish to input the sheet-piling length, the layout tool will also calculate exact weight for the given layout x direction (ft) [16]

y direction (ft) [18]

Sheet piling length (?) (ft) [26]
optional

Choose the appropriate piling designation(s)

☐ PZC 12
☑ PZC 13
☑ PZC 14
☑ PZC 17
☐ PZ27 RU
☐ PZC 18
☑ PZC 19
☐ PZC 25
☐ PZC 26
☐ PZ35
☐ PZC 28
☐ PZ 40

FIG. 7

Piling Designation

| Piling Designation | Solution Type | section modulus ? in³ / ft | weight ? lbs / ft² | width ? in |
|---|---|---|---|---|
| PZC 12 | ∪ | 22.4 | 20.0 | 27.88 |
| PZC 13 | ∪ | 24.2 | 21.7 | 27.88 |
| PZC 14 | ∪ | 26.0 | 23.7 | 27.88 |
| PZC 17 | ∪ | 31.0 | 22.3 | 25.00 |
| PZC27 RU | ∪ | 31.0 | 27.7 | 18.00 |
| PZC 18 | ∪ | 33.5 | 24.2 | 25.00 |
| PZC 19 | ∪ | 36.1 | 26.4 | 25.00 |
| PZC 25 | ∪ | 45.7 | 29.9 | 27.88 |
| PZC 26 | ∪ | 48.4 | 31.8 | 27.88 |
| PZ35 | ∪ | 48.9 | 35.0 | 22.64 |
| PZC 28 | ∪ | 51.2 | 34.0 | 27.88 |
| PZ40 | ∪ | 61.3 | 40.0 | 19.69 |
| PZC-B 41 | I∪I | 75.7 | 34.2 | 76.05 |
| PZC-B 45 | I∪I | 83.9 | 34.8 | 76.05 |
| PZC-B 51 | I∪I | 95.1 | 36.0 | 76.05 |
| PZC-B 57 | I∪I | 106.8 | 37.2 | 76.05 |
| PZC-B 62 | I∪I | 116.3 | 38.9 | 76.05 |
| PZC-B 65 | I∪I | 120.3 | 39.7 | 76.05 |
| PZC-B 68 | I∪I | 126.2 | 40.8 | 76.05 |
| PZC-B 70 | I∪I | 129.7 | 41.4 | 76.05 |
| PZC-B 77 | I∪I | 143.4 | 44.8 | 70.29 |
| PZC-B 89 | I∪I | 165.7 | 50.0 | 76.05 |
| PZC-B 98 | II∪II | 181.9 | 53.2 | 94.87 |
| PZC-B 100 | II∪II | 188.4 | 54.5 | 94.87 |
| PZC-B 106 | II∪II | 197.8 | 56.2 | 94.87 |
| PZC-B 109 | II∪II | 203.4 | 57.3 | 94.87 |
| PZC-B 118 | II∪II | 219.0 | 61.0 | 89.11 |
| PZC-B 140 | II∪II | 261.3 | 71.0 | 94.87 |
| PZC-B 151 | II∪II | 280.6 | 75.6 | 89.11 |
| PZC-B 160 | II∪II | 298.5 | 82.5 | 84.39 |

FIG. 8

Pile Designation Calculation

PSp900  PBS-M  PZC 13  PZC 13  PBS-F  PSp900

56.9"
76.2"

Detailed Specifications:

| | |
|---|---|
| section modulus ? | 95.1 in³ / ft |
| weight @ 60% ? | 36.0 lbs / ft² |
| weight @ 80% ? | 39.8 lbs / ft² |
| weight @ 100% ? | 43.6 lbs / ft² |
| panel width ? | 76.05 in |
| flexibility ? | ---- ° |
| setting ratio ? | 76.2 % |
| driving ratio ? | 23.8 % |
| nominal coating area ? | ---- ft² / ft |
| section depth ? | 35.43 in |
| moment of inertia ? | 1684.4 in⁴ |

🖨 Print data-sheet
✉ Email data-sheet
⬇ Download DWG File

Compute a wall solution

Wall length ? (ft) [ 50 ]

beam length ? (ft) [ 24 ]

sheet length ? (ft) [ 18 ]

( CALCULATE )

FIG. 9

Pile Designation Solution

View specifications    📥 Download DWG file    Cornering information
                     🖨 Print solution        Request a Quote
                     ✉ Email data-sheet    Engineering Help PSp900   PBS-M     PZC 13       PZC 13      PBS-F   PSp900

|← 56.9" →|
|← 76.2" →|

Solution Components

King Pile: PSp 900
Units: 7
Length: 24.00 feet
Tons: 13.1

Sheet-piling: PZC 13 (pair)
Units: 7
Length: 18.00 feet
Tons: 8.5

Connecter #1: PBS-M
Length: 18.00 feet
Number of feet: 126.00 feet
Tons: 0.8

Connector #2: PBS-F
Length: 18.00 feet
Number of feet: 126.00 feet
Tons: 0.9

Solution Summary

| | |
|---|---|
| Piling designation | PZC-B 51 |
| Wall length* | 44.36 ft |
| Sheet-Piling length | 18.00 ft |
| King Pile length | 24.00 ft |
| Section modulus | 95.1 in³/ft |
| lb/ft² | 38.9 |
| Total tons | 20.7 |
| Sections to drive | 7 |
| Setting ratio | 76.2 |
| Driving ratio | 23.8 |

* calculations will reflect the closest even number of wall sections

To recalculate based on a different custom sheet length, click here.

FIG. 10

Help "Flexibility"
Flexibility
This specification is critical, as the piling system's flexibility allows for easy setting of the intermediate sheet piling between the already driven king piles (beams).
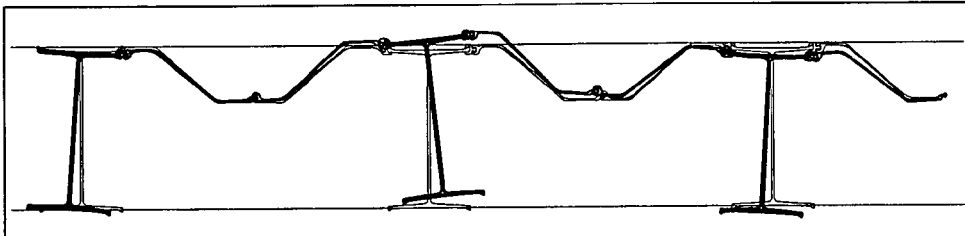
Furthermore it makes cornering of a piling system efficient and fabrication free.
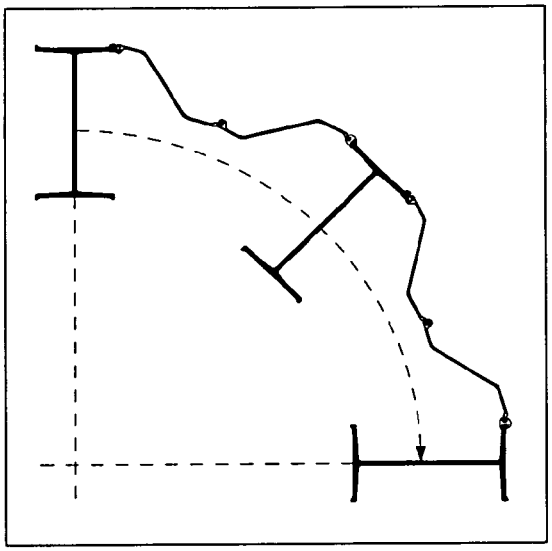
FIG. 11

Corrosion Tool

Sheet piling designations can be used in all environments provided that an adequate corrosion allowance is considered.

This tool allows the user to calculate the loss of steel thickness over time and equates this loss of metal to loss of section modulus.

³Corrosion allowance is defined as establishing the tickness of sacrifical metal (above what is structurally required for the piling) needed to compensate for the loss of metal (and hence section modulus) that will occur when a piling corrodes.³ (Caltrans, Corrosion Guidelines, September 2003.)

Thus this tool helps the user to establish a corrosion allowance for a particular piling designation to be installed in a particular environment.

Installation environment

Open air:
○ Normal
○ Near the ocean

Soil:
○ Undisturbed Natural ▯ sand, silt and clay
⊙ Disturbed Natural ▯ industrial areas
○ Aggressive Natural ▯ swamp or marsh
○ Fills ▯ non‑compacted clay, silt or sand
○ Agressive Fill ▯ compacted ashes or slag Fresh water:
○ Common ▯ rivers, ship canels
○ Polluted ▯ sewage, industrial refuge Salt water:
○ Splash zone or low water area
○ Zone of permanent immersion or in the tidal zone Required lifespan of wall  [25 years ◂▸]

Section Modulus (?) (in³/ft)  [40]
(minimum at end of lifespan)

( CALCULATE )

FIG. 12

Corrosion Tool Solution

- computed solutions

For a section modulus of a least 40.0 after 10 years in the environment "Soil: Disturbed Natural - industrial areas", your most efficient solutions by weight are:

| Piling designation | Default section modulus | Corroded section modulus (10 years) | Weight |
|---|---|---|---|
| PZC 25 | 45.73 in³/ft | 44.89 in³/ft | 29.9 lb/ft² |
| PZC-B 34 | 63.41 in³/ft | 63.38 in³/ft | 31.5 lb/ft² (@ 60% sheet length) |
| PZC 26 | 48.37 in³/ft | 47.53 in³/ft | 31.8 lb/ft² |
| PZC-B 39 | 72.58 in³/ft | 72.55 in³/ft | 32.7 lb/ft² (@ 60% sheet length) |
| PZC 28 | 51.23 in³/ft | 50.40 in³/ft | 34.0 lb/ft² |

FIG. 13

Section Moduls Tool

The Section modulus tools automatically calculates the necessary section modulus and determines a suitable sheet pile designation based on:

A) the loads, the sheet piles shall withstand
B) the maximum lifespan and/or
C) the installation enviroment Should you wish to input the sheet-piling length, the layout tool will also calculate exact weight for the given layout.

loads (kN) `1600` maximum lifespan (years) `18`

Sheet piling length (?) (ft)
optional `26`

Installation environment

Open air:
○ Normal
○ Near the ocean

Soil:
○ Undisturbed Natural - sand, silt and clay
⊙ Disturbed Natural - industrial areas
○ Aggressive Natural - swamp or marsh
○ Fills - non-compacted clay, silt or sand
○ Agressive Fill - compacted ashes or slag Fresh water:
○ Common - rivers, ship canels
○ Polluted - sewage, industrial refuge Salt water:
○ Splash zone or low water area
○ Zone of permanent immersion or in the tidal zone

FIG. 14

Section Modulus Tool Solution

Most efficient solution by weight is the      with lb/ft² of 24.2.

Section modulus ≥ 33.0 in³/ft,

Wall length of 50.00 ft*,

Sheet-piling length of 18.00 ft,

Additional alternatives:

| Piling designation | section Modulus ? | weight ? | wall length* ? | sections to drive ? | sections to set ? | Total Tons |
|---|---|---|---|---|---|---|
| PZC 18 | 33.5 in³/ft | 24.2 lb/ft² | 50.00 ft | n/a | 24 | 10.9 |
| PZC 19 | 36.1 in³/ft | 26.4 lb/ft² | 50.00 ft | n/a | 24 | 11.9 |
| PZC-B 34 | 63.4 in³/ft | 31.5 lb/ft² (@ 60% sheet length) | 45.55 ft | 8 | 8 | 12.9 (@ 60% sheet length) |
| PZC 25 | 45.7 in³/ft | 29.9 lb/ft² | 48.78 ft | n/a | 21 | 13.1 |
| PZC-B 39 | 72.6 in³/ft | 37.7 lb/ft² (@ 60% sheet length) | 46.21 ft | 8 | 8 | 13.6 (@ 60% sheet length) |

* calculations will reflect the closest number of piling designations needed

FIG. 15

Supplier Tool

| Piling Designation (?) | Section Modulus (?) | lbs/ft² (?) | Nominal Width (?) | Producer | Stock | Rolling Plant | Price | Used |
|---|---|---|---|---|---|---|---|---|
| PZC 12 | 22.4 | 20.0 | 27.88 | ☑ | ☑ | ☐ | ☐ | ☐ |
| PZC 13 | 24.2 | 21.7 | 27.88 | ☐ | ☐ | ☐ | ☐ | ☐ |
| PZC 14 | 26.0 | 23.7 | 27.88 | ☐ | ☐ | ☐ | ☐ | ☐ |
| PZC 17 | 31.0 | 22.3 | 25.00 | ☐ | ☐ | ☐ | ☐ | ☐ |
| PZ27 RU | 31.0 | 27.7 | 18.00 | ☐ | ☐ | ☐ | ☐ | ☐ |
| PZC 18 | 33.5 | 24.2 | 25.00 | ☐ | ☐ | ☐ | ☐ | ☐ |
| PZC 19 | 36.1 | 26.4 | 25.00 | ☐ | ☐ | ☐ | ☐ | ☐ |
| PZC 25 | 45.7 | 29.9 | 27.88 | ☐ | ☐ | ☐ | ☐ | ☐ |
| PZC 26 | 48.4 | 31.8 | 27.88 | ☐ | ☐ | ☐ | ☐ | ☐ |
| PZ35 | 48.9 | 35.0 | 22.64 | ☐ | ☐ | ☐ | ☐ | ☐ |
| PZC 28 | 51.2 | 34.0 | 27.88 | ☐ | ☐ | ☐ | ☐ | ☐ |
| PZ 40 | 61.3 | 40.0 | 16.69 | ☐ | ☐ | ☐ | ☐ | ☐ |

FIG. 16

Equipment Tool

The equipment tool automatically determines devices being suitable for ramming or vibrating the sheet pile component determined in one of the other tools
based on:
A) the sheet pile being determined in one of the tools
B) installation environment Further, you can directly contact a company offering for sale of rent a suitable device pile designation (?)    PZC 14

Installation environment

Open air:
○ Normal
○ Near the ocean

Soil:
○ Undisturbed Natural - sand, silt and clay
⊙ Disturbed Natural - industrial areas
○ Aggressive Natural - swamp or marsh
○ Fills - non-compacted clay, silt or sand
○ Agressive Fill - compacted ashes or slag Fresh water:
○ Common - rivers, ship canels
○ Polluted - sewage, industrial refuge Salt water:
○ Splash zone or low water area
○ Zone of permanent immersion or in the tidal zone

FIG. 17

Equipment Tool Result

The equipment which can be used for installing PZC 14 sheet piles is a vibrator having the follwoing technical characteristics:

| Vibrator | Type | MS-16 HF | MS-25 H2 | MS-25 H3 | MS-50 H2 | MS-50 H3 |
|---|---|---|---|---|---|---|
| Technical Data | | | | | | |
| Centrifugal force | kN | 969 | 774 | 774 | 1430 | 1430 |
| Eccentric moment | kgm | 16 | 25 | 25 | 50 | 50 |
| | | | | | | |
| Speed max. | rpm | 2350 | 1680 | 1680 | 1615 | 1615 |
| Frequenzy | Hz | 39,2 | 28,0 | 28 | 27 | 27 |
| Pulling force | kN | 300 | 400 | 400 | 500 | 500 |
| | | | | | | |
| Weight (dyn.) excl. clamp | kg | 1700 | 1930 | 2550 | 3340 | 3820 |
| Weight (total) excl. clamp | kg | 3000 | 3200 | 3600 | 6300 | 6790 |
| Amplitude (S=2 s) | mm | 18,8 | 25,9 | 19,6 | 29,9 | 26,2 |
| | | | | | | |
| Vibrator performance max. | kW | 165  219 | 218 | 218 | 305  419 | 419 |
| Absorption volume | ltr./min | 282  376 | 374 | 374 | 523  719 | 719 |
| Operating pressure max. | bar | 350  350 | 350 | 350 | 350  350 | 350 |
| | | | | | | |
| Length L | mm | 1700 | 2200 | 2200 | 2600 | 2600 |
| Width W | mm | 929 | 681 | 777 | 696 | 696 |
| Height H | mm | 1985 | 1685 | 1745 | 2035 | 2095 |
| Waiste-line WL | mm | 350 | 340 | 402 | 340 | 402 |

Such a vibrator is offered by the company A. For more information click here COMPANY A

FIG. 18

METHOD FOR PLANNING SHEET PILE WALL SECTIONS

BACKGROUND OF THE INVENTION

The present invention relates to a method used for planning sheet pile wall sections, in which suitable components and/or layouts for sheet pile wall sections, for the erection of sheet pile walls and wall sections, are determined.

Currently, the planning of sheet pile wall sections—such as sheet pile walls, combi-walls (a combination of sheet piles and beams, connected with each other), or cofferdams—is done by CAD-systems. However, the determination of suitable components for sheet pile walls used for the erection of sheet pile wall sections—such as the sheet pile itself, connectors for connecting sheet piles, beams and so on—is done by hand. For this purpose the suppliers provide the companies responsible for the planning of the sheet pile wall sections with brochures, lists and handbooks, in which the different components and their technical characteristics are listed.

However, as it is obvious, there is an unbelievably large number of different components for sheet pile walls, due to the large number of suppliers and the even greater number of different types of components for sheet pile walls, such as: Larssen sheet piles, Hoesch sheet piles, flat sheet piles, T-beams, double-T-beams, Peiner-beams, pales, and connectors, used for connecting the different types of sheet piles, beams and so on. Furthermore, each type of sheet pile and beam is offered in a large range of different dimensions, dependent upon the respective purpose each sheet pile wall is to be used for.

Due to the large variety of the sheet pile wall components, the civil engineer who has to plan the sheet pile wall section is able to find only a few of the components which could be used.

SUMMARY OF THE INVENTION

The objective to be achieved by the present invention is to provide a method whereby the determination of suitable components for the layout of sheet pile wall sections and/or suitable layouts, compared to the above-described way of determining suitable components and layouts, is made much easier.

This objective, as well as other objectives which will become apparent from the discussion that follows, are achieved, according to the present invention by a method which comprises the steps of: (a) entering at least two constructional parameters of the sheet pile wall section, via the user-oriented network, into the computer system, within which various data of components for the layout of a sheet pile wall section, data of layouts for sheet pile wall sections, and technical characteristics of the components and the layouts are stored in a database of the computer system; (b) determining at least one suitable component and/or at least one suitable layout, via the computer system, on the basis of the entered construction parameters and the technical characteristics stored in the database; and (c) providing the user with the data of the component and/or layout determined in step (b) and the technical characteristics of the determined component and/or the layout, via the user-oriented network.

According to the invention, it is proposed that a user-oriented network be used—in particular, the Internet—to provide user planning sheet pile wall sections with relevant information and data of wall components and even layouts. One example is a civil engineer who can be offered a large number of different types of components and their dimensions for layouts of sheet pile wall sections, as well as their different suppliers. Due to the fact that a user oriented network is used, the user has the possibility to easily get all the information needed when planning sheet pile wall sections. In particular the use of the computer system makes it easily possible to provide the user with all different types of components and their different dimensions, offered by different suppliers. The user has only to enter the user oriented network, which can be access-limited via passwords, and inputs his constructional parameters. For example, the user could input: an estimated maximum load acting on the sheet pile wall section; the length of the sheet pile wall section; the axial length of the component; or other specifics of the sheet pile wall section he is planning. Based on both the entered constructional parameters and the stored technical characteristics of the components, the computer system then determines at least one suitable component and/or a suitable layout of a sheet pile wall section and provides the user with at least technical characteristics and, if necessary, other technical information (for example, a suitable layout). Thus, the invention enables a user who is planning a sheet pile wall installation to very easily ascertain what type of component or layout is suitable for his specific constructional work.

Further versions and embodiments of the present method can be taken from the following specification, sub-claims and figures.

In a preferred embodiment of the method according to the invention, it is proposed to determine that component or layout as being suitable in step (b) which has a sufficient strength and/or the lowest total weight compared to the other components or layouts stored in the database. Due to the transportation and material costs—as well as the equipment which must be used for erecting the sheet pile walls—the weight of the components of the sheet pile walls is one of the main characteristics which is important for the determination of the appropriateness of a component. The most suitable component has both the lowest weight and a sufficient section modulus over its lifespan.

Since users frequently have different prerequisites in establishing which type of component or layout is suitable for their respective problem, it is suggested, in a further embodiment of the method, that the user should have the possibility to select between different determination tools in step (a) before entering the constructional parameters.

In one preferred embodiment of the present invention, it is proposed that one of the selectable tools is a wall tool for determining a suitable sheet pile component for a wall section. After selecting the wall tool, the user may enter in step (a) the length of the sheet pile wall section, the axial length of the sheet pile to be used, and the minimum section modulus of the component, all of which are to be used as constructional parameters. As a result, the user is provided with data of at least one suitable component.

In a preferred version of this embodiment, the determination in step (b) is carried out by determining, from the components stored in the database, which component, or combination of components, will lead to the lowest total weight of the sheet pile wall section having said predetermined length, as entered in step (a).

As a further result of the wall tool: the number of components to be driven or set into the ground and the total weight of the sheet pile wall section are both provided to the user. Based on this data, the user is able to design the most efficient arrangement or layout of the planned sheet pile wall section.

Additionally, it is proposed to supplement the information sent to the user in step (c) with a layout of the wall section using the suggested components.

Another of the selectable tools is preferably a layout tool for determining a suitable cofferdam layout, the components of which are sheet piles and sheet pile connectors. After selecting the layout tool, the user, as in step (a), only has to enter the length and width of a cofferdam layout, plus the sheet pile to be used as constructional parameters. The computer system then determines at least one suitable layout for the cofferdam and provides the user with data in step (c) as to the suitable layout for the cofferdam.

The determination in the layout tool is preferably done by determining in step (b) between the data of different cofferdam layouts stored in the database as technical characteristics. The most suitable cofferdam layout is preferably determined as the one with sufficient strength and lowest total weight compared to the other cofferdam layouts.

Furthermore, it is suggested that the solution determined by the layout tool and provided in step (c) also comprise the number of sheet piles and sheet pile connectors to be driven or set into the ground, as well as the total weight of the cofferdam.

Another selectable tool is a piling designation tool for determining the number of components necessary for erecting a sheet pile wall section. With this tool the user already knows the type of component he wants to use. When selecting the piling designation tool, the user only has to enter, in step (a), the type of component(s) to be used, the length of the sheet pile wall section, and the length(s) of the component(s) as constructional parameters. In step (c) as a result, the user is provided with the data of the selected component(s), the number of the components necessary for erecting the sheet pile wall section, and the total weight of the sheet pile wall section.

In addition a selectable tool suggested in a preferred embodiment is the corrosion tool. Using this tool it is possible to determine the resistance of corrosion of a sheet pile wall layout. When selecting the corrosion tool, the user must enter, in step (a), at least two of the following constructional parameters: information with respect to the installation environment; and/or the required lifespan of the sheet pile wall; and/or the minimum section modulus; and/or the type of component to be used. Depending on the entered constructional parameters, the user may be provided in step (c) with: data of at least one suitable component; and/or data relating to the installation environment; and/or the lifespan of the component.

The determination is preferably based on the following: corrosion data related to the installation environment; data relating to the corrosion rate of different components for sheet pile walls; and data relating to the reduction of section modulus caused by corrosion. Based on both this corrosion data and the constructional parameters in step (a) of the corrosion tool, a suitable component is determined.

Furthermore, it is helpful for a user to know the sectional modulus of a suitable component. For this purpose, in an additional preferred embodiment of the method according to the invention, a section modulus tool is selectable for determining the section modulus of a suitable component. When selecting this tool, in step (a) the user must enter the following as constructional parameters: the loads acting on the sheet pile wall section; the maximum lifespan; and/or the installation environment. In step (c) as result, the user is provided with the data of at least one suitable component, its section modulus, and its technical characteristics.

The determination of the suitable component is preferably based on technical characteristics, wherein the technical characteristics comprise the maximum moment of resistance of the component and the yield point of the material of the component stored in the database. The section modulus is then calculated by the formula:

$$S_{min} = M_{max}/0.65 F_y$$

wherein $S_{min}$ is the minimum allowable section modulus, $M_{max}$ is the maximum moment of resistance of the component, and $F_y$ is the yield point of the material of the component. After the calculation of different section modulus values of different components, that component is determined as being the suitable component which has a sufficient minimum allowable section modulus and the lowest weight compared to the other components.

Since the users are also interested in learning what type of equipment can be used for ramming or vibrating the components of the sheet pile wall sections into the ground, technical characteristics and data of such devices are stored in the database. Based on the data and technical characteristics of the component or layout determined in step (b), and based on the technical characteristics and data of said different devices, at least one of these devices is determined as being suitable. The technical characteristics and data of the suitable equipment are then provided to the user.

In order to determine the suitable equipment, the data of the component or the layout to be installed preferably include data with respect to the installation environment, the weight of the individual component to be installed, and the surface area of the component. The data of the devices should include the weight of the individual device (e.g., vibration hammers and clamps). For determining a suitable device, in particular a vibrator, the pull at the crane hook is calculated by the formula:

$$P_{pull} = (W_V + W_R) \times 9.81 + 0.1 \times (R_M \times F)$$

wherein $P_{pull}$ is the pull at the crane hook, $W_V$ is the weight of the device, $W_R$ is the weight of the component to be installed, $R_M$ is a surface friction value, and F is the surface area of the component to be installed. The device having the lowest pull is determined as being the suitable device. The user can then directly contact (via a link, for example) the particular company offering the determined device for sale or rent.

Additionally, in the method according to the present invention, it is suggested that the component's CAD-data (for example a DWG- or a DXF-file) and technical characteristics, at the least, are provided for download by the user via the user-oriented network.

After the determination of the component(s) or the layout in step (c), it is also suggested, in a preferred embodiment of the method, that the user can get information data via the user-oriented network about a suitable supplier, wherein the data comprises information about the producer, stocks, rolling plants, and/or the actual prices of the components.

Data with respect to the producer can, for example, include where the product is made and under what terms and tolerances it is delivered. Data with respect to the stock can, for example, include the amount and location of stocks of this particular component. Further, the user can be informed about the exact lengths of available components and would even be able to actually order from this particular stock, or else make a binding offer to purchase the product. Data with respect to the rolling plant can comprise rolling schedules of the plants and the ability to actually go in and book an order from a specific rolling. It is also possible to get information about used sheet pile wall components.

The method according to the present invention can be provided with all, or only a few, of the above-mentioned different tools.

For a full understanding of the present invention, reference should now be made to the following detailed description of the preferred embodiments of the invention as illustrated in the accompanying drawings.

BRIEF DESCRIPTION OF THE DRAWINGS

FIG. 3 shows the result window of the wall tool;

FIG. 4 shows the information window of a specific component determined by the wall tool;

FIG. 5 shows the input mask of a layout tool window;

FIG. 7 shows the information window of a specific sheet pile used in the layout shown in the result window of the layout tool;

FIG. 8 shows the input mask of a piling designation tool window;

FIG. 9 shows the result window of the piling designation tool;

FIG. 10 shows the information window of a specific sheet pile determined by the piling designation tool;

FIG. 11 shows an example of a help window, informing the user of a definition of a specific technical characteristic;

FIG. 12 shows the input mask of a corrosion tool window;

FIG. 13 shows the result window depicting the result determined by the corrosion tool;

FIG. 14 shows the input mask of a section modulus tool window;

FIG. 15 shows the result window depicting the result determined by the section modulus tool;

FIG. 16 shows the input mask of a supplier tool;

FIG. 17 shows the input mask of an equipment tool; and

FIG. 18 shows the result window of the equipment tool.

DESCRIPTION OF THE PREFERRED EMBODIMENTS

Figure 1:
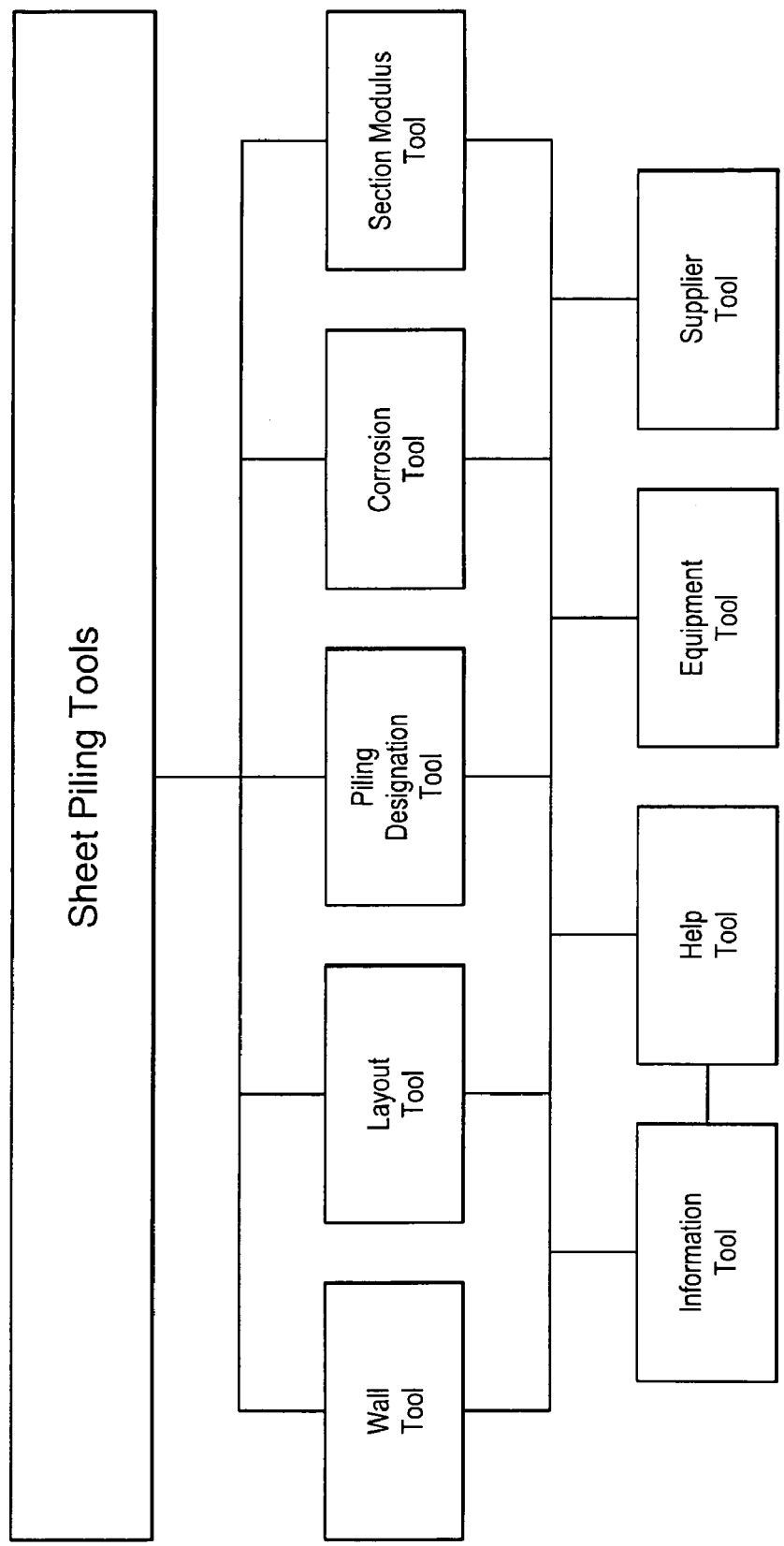
FIG. 1 shows a block diagram of the different tools used in a preferred embodiment of the method according to the present invention.

The preferred embodiments of the present invention will now be described with reference to FIGS. 1-18 of the drawings. Identical elements in the various figures are designated with the same reference numerals.

FIG. 1 shows a block diagram of a program which works according to a preferred embodiment of the method according to the present invention. The program has a main routine which controls subroutines of different tools used in the method. The program is stored in the memory of a computer system. Additionally, the memory of the computer system is separated into several database sections in which technical characteristics of different components for sheet pile walls and data of the components are stored.

For example, the database includes technical characteristics of different dimensions and different sheet pile types, such as Larssen sheet piles, Hoesch sheet piles or flat sheet piles. Also, the technical characteristics of a large number of different connectors for connecting the sheet piles with each other—as well as technical data of beams such as double-T-beams, T-beams, pales or Peiner-beams—are stored in the database. Additionally, different basic layouts for sheet pile wall sections, such as cofferdams, and their technical characteristics are stored in the database The computer system is connected to a user-oriented network. In the present embodiment, the computer network is accessed via the Internet, so that the user can enter the program without any restrictions. However, the program can also be used in an intranet version with a restricted access just for the users.

When activated, the program opens the main routine, and a starting mask is opened called "sheet piling tools." Afterwards, the user has the ability to select between five subroutines defining the five following working tools: a wall tool, a layout tool, a piling designation tool, a corrosion tool, and a section modulus tool.

Additionally, an information tool and a help tool are provided which can be activated by the user when he works in one of the above-mentioned five working tools. The information tool gives further information with respect to a specific component or layout of the results received via the respective working tool. The help tool gives additional information with respect to specific topics and terms.

After one of the five working tools has been activated, a result is provided to the user. The user then has the choice of using the result received by one of the working tools in two support tools, namely an equipment tool and a supplier tool.

In the following, the functions of the different tools will be explained in detail; it must be emphasized, however, that the design and the function of the different tools is not restricted to the present embodiment.

At first the user must decide whether he wants to work with the program using metric or imperial dimensions. Next, the user is able to select between the different tools.

Figure 2:
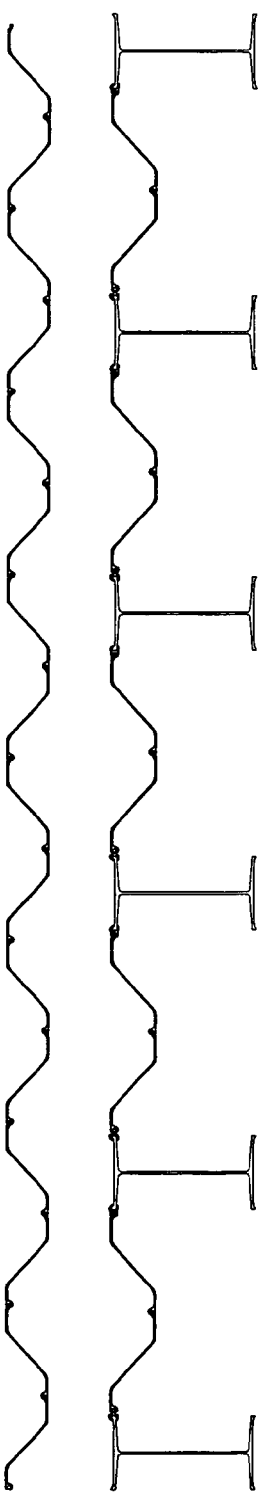
FIG. 2 shows the input mask of a wall tool window.

In FIG. 2 the input mask of the wall tool is shown. When the user activates the wall tool,—by a click or a shortcut, for example,—the input mask of the wall tool shown in FIG. 2 pops up as new window. In the input mask of the wall tool, the user is then able to insert different constructional parameters of a proposed sheet pile wall layout into the system. In the present example, the user is asked to insert the following data: the wall length of the entire sheet pile wall section; the axial length of the component of the sheet pile wall, namely the axial length of the sheet pile itself; and a minimum value for the section modulus of the sheet pile.

Afterwards, he activates the calculate button. The wall tool determines a suitable sheet pile as the component and the compatible number of sheet piles necessary to erect the wall section. The determination is based on the technical characteristics of the different sheet pile components stored in the database, in particular the section modulus and the weight of the components. Next, six sheet piles are determined which have a sufficient section modulus as well as the lowest weights when erected to the sheet pile wall.

After the determination is completed, the result is depicted in a result window, called a "wall tool solution" (1). In FIG. 3 such a result window is shown. In this result window the name of the component that is the most efficient solution by weight is given. Additional technical characteristics of the component are shown: for example, the section modulus of the component, the wall length and the weight. In addition, a table of five further alternative components is displayed. The user then is able to activate the information tool by clicking on the name of the component. An information window pops up, an example of which is shown in FIG. 4.

In this information window all relevant technical characteristics of the proposed wall solution are depicted, including: the name of the component; how many components have to be used; if necessary, which type of additional connectors have to be used; and the total weight of the proposed solution. In the present solution depicted in FIG. 4, a combi-wall is proposed under the name PZC-B 34. The combi-wall is a combination of regular double-T-beams (called W30X108) and two sheet piles (named PZC 13). For connecting the double- T-beams with the sheet piles, the use of a BBS-M and a BBS-F connector is suggested. For additional data, the user is then able to download DWG-files, print the solution, request an e-mail data-sheet, ask for engineering help, request a quote, or ask for further information. Buttons for these different functions are also depicted in the result window.

The next tool which can be activated by the user is the lay-out tool. If the user activates this tool, the input mask shown in FIG. 5 pops up. The user must then insert clear dimensions of a cofferdam—meaning, the length of the cofferdam in x direction and the length of the cofferdam in y di-rection—as constructional parameters. Additionally, the user has to insert at least one appropriate piling designation—for example, PZC 13, PZC 14 and so on. If the user is not sure which type of piling designation he should choose, he can click on the name of the respective piling designation and an information window pops up, comparable to the information window shown in FIG. 4.

Figure 6:
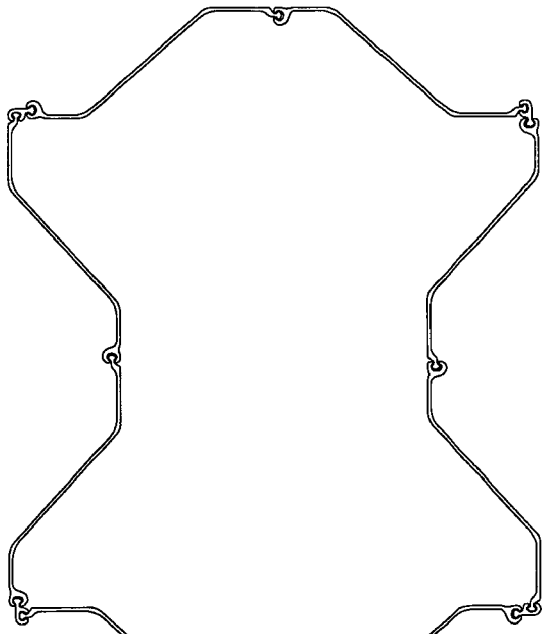
FIG. 6 shows the result window of the layout tool.

After the different constructional parameters and the piling designation have been inserted, the layout tool determines the most efficient solution by weight by comparing the different sheet piles and basic layouts stored in the database. When the determination is finished, a result window pops up, showing the proposed solution. Such a result window is shown in FIG. 6 The proposed solution depicts the number of sheet piles and connectors to be used, and it also depicts the basic layout of the cofferdam.

Figure 7:
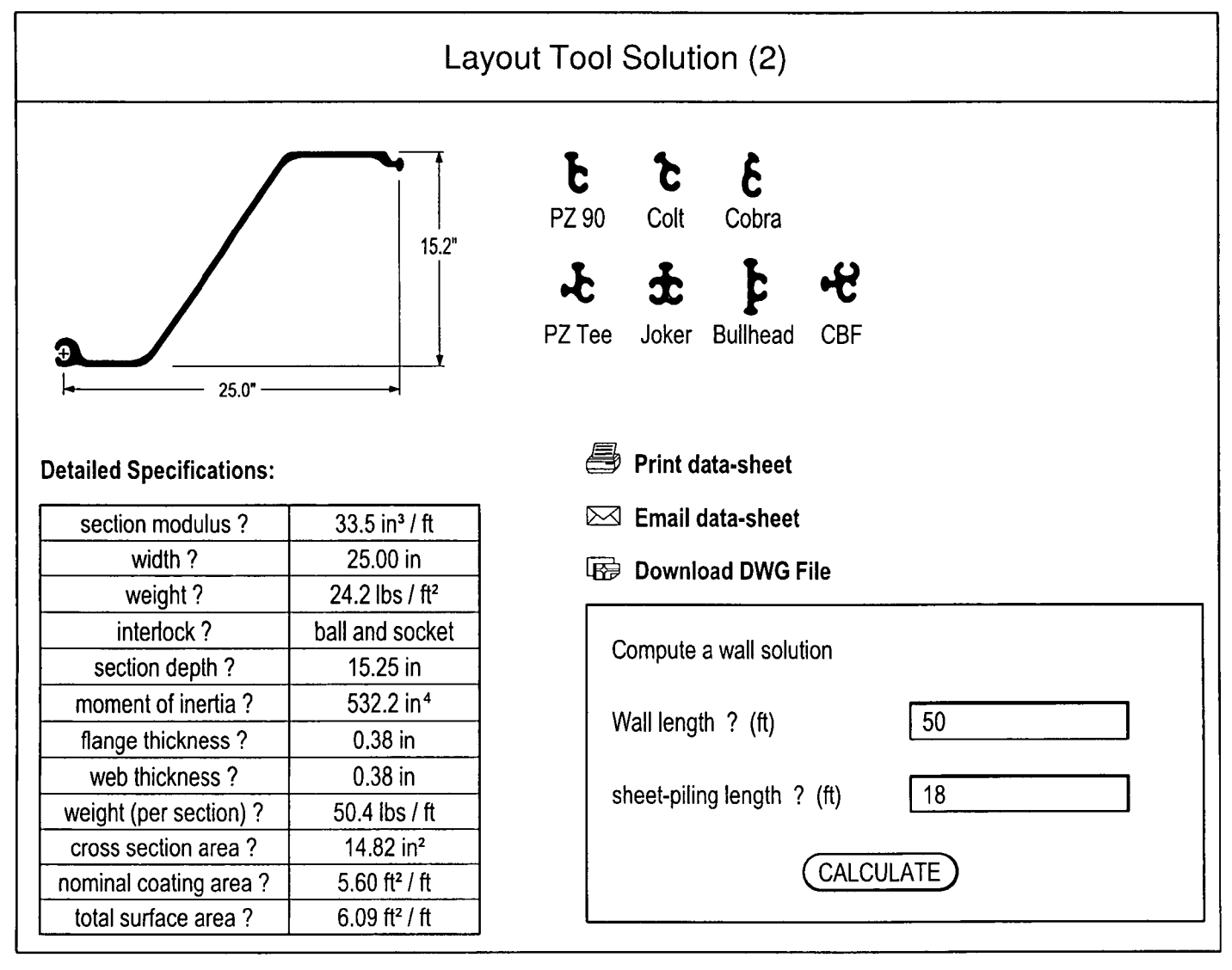

The user is then able to print the solution, request a quote or seek engineering help. Additionally, the user can activate an information window by clicking on one of the names of the sheet pile or the connector, and an information window pops up. In FIG. 7 such an information window is shown. In this information window a detailed specification of the technical characteristics of the component—as well as information with respect to the usable connectors, such as the PZ 90, the Colt, the Cobra, the PZ Tee, the Joker, the Bullhead or the CBF—are shown. Also, DWG-files of the different components can be downloaded.

FIG. 8 shows the input mask of the piling designation tool. When the input mask for the piling designation tool is activated, the user must first decide which type of sheet pile or combi-wall section he wants to use. Thus, the basic technical characteristics are shown in a table for his consideration. After clicking on the selected sheet pile, a calculation window pops up, which is shown in FIG. 9. In the calculation window a selected combi-wall section is depicted with a detailed specification of the technical characteristics. Also, a calculation area is depicted in which the user has to input the wall length, the beam length and the sheet length of the components of the depicted combi-wall. After activating the calculation button, the piling designation tool calculates the most efficient solution by weight. Next, a result window pops up (see FIG. 10), comparable to the result window shown in FIG. 4.

Sometimes the user is not sure what a specific term means. If this is the case, he has the option of activating a help tool to get a definition of the particular term. As an example, in the detailed specification of the result window shown in FIG. 9, the user can activate the respective term, which, in this case, is "flexibility." After clicking on the term, a help window pops up (cf. FIG. 11) in which a definition of the term flexibility is given.

A further tool is the so-called corrosion tool. If the user wants to know, for example, how long a sheet pile wall will last under a specific installation environment, he can find out by activating the corrosion tool. Once he does so, the input mask of the corrosion tool pops up, which is shown in FIG. 12. The user may then select between different installation environments, such as open air, soil, fresh water or salt water. He may also differentiate in the respective main group. In the shown example the user has selected the characteristic "soil in an industrial area." Next, he can define the required lifespan of the wall and/or the minimum of the section modulus at the end of the lifespan.

In the following a table shows the coherency between corrosion under different installation environments and the loss of section modulus due to corrosion of a specific sheet pile:

| Installation environment | Loss of section modulus years | | | | |
|---|---|---|---|---|---|
| | 5 | 10 | 15 | 20 | 25 |
| open air | | | | | |
| a) normal | 1290 | 1240 | 1260 | 1225 | 1190 |
| b) near the ocean | 1280 | 1220 | 1190 | 1125 | 1085 |
| Soil | | | | | |
| a) undisturbed natural | 1300 | 1270 | 1220 | 1200 | 1120 |
| b) disturbed natural | 1280 | 1250 | 1085 | 1140 | 975 |
| c) aggressive natural | 1275 | 1190 | 1035 | 1020 | 940 |
| d) fills | 1278 | 1230 | 1078 | 1050 | 1000 |
| e) aggressive fills | 1260 | 1055 | 940 | 785 | 690 |
| fresh water | | | | | |
| a) common - rivers, canals | 1250 | 1245 | 1180 | 1165 | 1125 |
| b) polluted | 1270 | 1195 | 1040 | 965 | 840 |
| salt water | | | | | |
| a) splash zone | 1250 | 1200 | 1035 | 1010 | 925 |
| b) zone of immersion | 1270 | 1020 | 880 | 685 | 480 |

Based on technical characteristics and corrosion tables which are stored in the database of the computer system (see the above example), a result window pops up (as shown in FIG. 13) in which five different possible solutions are depicted along with the default of section modulus, the corroded section modulus in 10 years, and the remaining weight. Also in this result window, as in the other result windows, the user can receive more information about the respective component by simply clicking on the name of the component in the list.

In some cases, the user may want to know something about a necessary section modulus based on the loads acting on the component, the maximum lifespan, and the installation environment. For this purpose a section modulus tool is provided. When activated, an input mask pops up (as shown in FIG. 14) in which the user can insert both the loads and the maximum lifespan. He can also define the installation environment. Afterwards, based on technical characteristics stored in the database, the section modulus tool determines a suitable component, wherein the technical characteristics comprise the component's maximum moment of resistance and its yield point of the material. Thus, the section modulus is calculated by the formula:

$$S_{min} = M_{max}/0.65 F_y$$

In the above formula $S_{min}$ is the minimum allowable section modulus, $M_{max}$ is the maximum moment of resistance of the component, and $F_y$ is the yield point of the material of the component. That component is determined as being suitable if it has both a sufficient minimum allowable section modulus and the lowest weight compared to the other sheet pile components.

After the determination of the suitable component, a result window pops up (as it is shown in FIG. 15) in which five solutions are depicted. Also in this result window, the user can get further information by clicking on the name of the respective component.

Having determined suitable components, the user is able to search for a supplier of piling designations and connectors. For this purpose he can activate the supplier tool. The user can receive information with respect to a producer or supplier, a stock, a rolling plant, prices, or even check the availability of used sheet pile wall components. The user is then able to directly order the determined components.

If the user also wants to know something about suitable equipment—e.g., a vibrator or a ram for erecting the sheet pile wall section—he can use the equipment tool. When the equipment tool is activated, an input mask pops up (as depicted in FIG. 17). In this input mask the user inserts the piling designation and the installation environment. Based on these constructional parameters, the technical characteristics of the selected component, (the weight and surface area of the component to be installed, which are already included in the computer system's database), and the data of the devices, including the weight of the individual device, that device is determined as being suitable which has the lowest pull at the crane hook. The pull is calculated by the formula:

$$P_{pull} = (W_V + W_R) \times 9.81 + 0.1 \times (R_M \times F)$$

In this formula $P_{pull}$ is the pull at the crane hook, $W_V$ is the weight of the device, $W_R$ is the weight of the component to be installed, $R_M$ is a surface friction value, and F is the surface area of the component to be installed.

After the determination of suitable equipment, a result window pops up showing the technical characteristics of the equipment. Such a result window is shown in FIG. 18. The user can then directly contact the company which offers the equipment for rent or sale.

The above described method is only a preferred embodiment. Of course, the program can also be supplemented by further tools, such as CAD-tools.

A further idea, on which the present invention is based, is the idea that all major suppliers and producers of sheet pile components (sheet piles, beams, connectors for sheet piles) and equipment for erecting sheet pile walls enter the technical characteristics of their products as data into the database of the computer system. Thus, the user has a large variety of possible products and producers.

There has thus been shown and described a novel method for planning sheet pile wall sections which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method used for planning sheet pile wall sections via a user-oriented network—in particular, the Internet—in which at least technical characteristics of a suitable component for the layout of a sheet pile wall section and/or the layout of a sheet pile wall section itself is determined for the user by a computer system, said method comprising the steps of:

(a) entering at least two constructional parameters of the sheet pile wall section via the user-oriented network into the computer system, wherein in a database of the computer system data of components for the layout of a sheet pile wall section, data of layouts for sheet pile wall sections, and technical characteristics of the components and the layouts are all stored;

(b) automatically determining at least one suitable component and/or at least one suitable layout by means of the computer system on the basis of the entered construction parameters and the technical characteristics stored in the database; and (c) providing the user with the data and technical characteristics of the component and/or layout determined in step (b) via the user-oriented network.

2. The method according to claim 1, in which in step (b) that component or that layout is determined as being suitable which has a sufficient strength and/or the lowest total weight compared to the other components or layouts stored in the database.

3. The method according to claim 1, in which in step (a) the user has the possibility to select between different determination tools before entering the constructional parameters.

4. The method according to claim 3, in which one of the selectable tools is a wall tool for determining a suitable sheet pile component for a sheet pile wall section; and in which after selecting the wall tool the user has to enter as constructional parameters in step (a) the length of the sheet pile wall section, the axial length of the sheet pile to be used, and the minimum section modulus of the sheet pile to be used; and in which as a result, in step (c) the data of at least one suitable component is provided to the user.

5. The method according to claim 4, in which, when the wall tool is selected in step (b) from the components stored in the database, that component, or that combination of components, is determined as being suitable which, compared to the other components stored in the database, leads to the lowest total weight of the sheet pile wall section having said predetermined length entered in step (a).

6. The method according to claim 4, in which in step (c) the number of components to be driven or set into the ground and the total weight of the sheet pile wall section are provided to the user.

7. The method according to claim 4, in which in step (c) the layout of the wall section is provided to the user.

8. The method according to claim 3, in which one of the selectable tools is a layout tool for determining a suitable cofferdam layout, the components of which are sheet piles and sheet pile connectors; and in which after selecting the layout tool, the user has to enter as constructional parameters in step (a) the length and width of the cofferdam layout, as well as the sheet pile to be used for the cofferdam layout; and in which as a result, in step (c) the data of at least one suitable layout for a cofferdam is provided to the user.

9. The method according to claim 8, in which, when the layout tool is selected in step (b) from the data of different cofferdam layouts stored in the database as technical characteristics, that layout for a cofferdam layout is determined as being suitable which has a sufficient strength and, compared to the other cofferdam layouts, the lowest total weight.

10. The method according to claim 8, in which in step (c) the number of sheet piles and sheet pile connectors to be driven or set into the ground and the total weight of the cofferdam are both provided to the user.

11. The method according to claim 3, in which one of the selectable tools is a piling designation tool for determining the number of components necessary for erecting a sheet pile wall section; and in which, when selecting the piling designation tool, the user has to enter in step (a) the type of component(s) to be used, the length of the sheet pile wall section, and the length(s) of the component(s) as constructional parameters; and in which as a result, in step (c) the data of the selected component(s), the number of the components necessary for erecting the sheet pile wall section, and the total weight of the sheet pile wall section are provided to the user.

12. The method according to claim 3, in which one of the selectable tools is a corrosion tool for determining the resistance of corrosion of a sheet pile wall layout; and in which, when selecting the corrosion tool, the user has to enter in step (a) at least two constructional parameters comprising (1) information with respect to the installation environment, (2) the required lifespan, (3) the minimum section modulus, and (4) the type of component to be used as constructional parameters; and in which as a result, in step (c), the data of at least (1) one suitable component, (2) data relating to the installation environment, and (3) the lifetime of the component is provided to the user.

13. The method according to claim 12, in which in step (b), based on corrosion data, a suitable component, prerequisites of the installation environment, a maximum lifespan for a given sectional modulus, or a minimum section modulus for a predetermined lifespan is determined, wherein the corrosion data is comprised of data relating to the installation environment, data relating to the corrosion rate of different components for sheet pile walls, and data relating to the reduction of section modulus caused by corrosion.

14. The method according to claim 3, in which one of the selectable tools is a section modulus tool for determining the section modulus of a suitable component; and in which, when selecting the section modulus tool, the user has to enter in step (a) the loads acting on the sheet pile wall section and the maximum lifespan and/or the installation environment as constructional parameters; and in which as a result, in step (c) the data of at least one suitable component, its section modulus and its technical characteristics are provided to the user.

15. The method according to claim 14, in which in step (b), based on technical characteristics, a suitable component is determined, wherein the technical characteristics comprise the maximum moment of resistance of the component and the yield point of the material of the component; and wherein the section modulus is calculated by the formula:

$$S_{min}=M_{max}/0.65F_y$$

wherein $S_{min}$ is the minimum allowable section modulus, $M_{max}$ is the maximum moment of resistance of the component, and $F_y$ is the yield point of the material of the component; and in which that component is determined as being the suitable component which has both a sufficient minimum allowable section modulus and the lowest weight compared to the other sheet pile components.

16. The method according to claim 1, in which in the database, technical characteristics and data of different devices for ramming or vibrating components of sheet pile walls into the ground; and in which based on the data and technical characteristics of the component or layout determined in step (b); and based on the technical characteristics and data of said different devices, at least one device is determined as being suitable, the technical characteristics and data of which are provided to the user.

17. The method according to claim 16, in which the data of the component or the layout to be installed include data with respect to the installation environment, the weight of the individual component to be installed, and the surface area of the component to be installed; wherein the data of the devices includes the weight of the individual device; and wherein that device is being determined as suitable which has the lowest pull at the crane hook, wherein the pull is calculated by the formula:

$$P_{Pull}=(W_V+W_R)\times 981+0.1\times(R_M\times F)$$

wherein $P_{Pull}$ is the pull at the crane hook, $W_V$ is the weight of the device, $W_R$ is the weight of the component to be installed, $P_M$ is a surface friction value, and F is the surface area of the component to be installed.

18. The method according to claim 1, in which, for at least the components, CAD-data and technical characteristics are provided for download by the user via the user-oriented network.

19. The method according to claim 1, in which, after the determination of the component(s) or the layout in step (c), in a further step the user can get information data via the user-oriented network about a suitable supplier, wherein the information data comprises information about the producer, and/or the stock, and/or the rolling plant, and/or the price of the components.

* * * * *